United States Patent
Wenthen

(12) 
(10) Patent No.: US 7,631,719 B2
(45) Date of Patent: Dec. 15, 2009

(54) ELECTRICALLY-DRIVEN TRANSFER CASE WITH POWER TAKE-OFF

(75) Inventor: David Wenthen, Syracuse, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 233 days.

(21) Appl. No.: 11/834,051

(22) Filed: Aug. 6, 2007

(65) Prior Publication Data

US 2007/0267233 A1    Nov. 22, 2007

Related U.S. Application Data

(63) Continuation-in-part of application No. 11/517,400, filed on Sep. 7, 2006, now Pat. No. 7,395,893, which is a continuation of application No. 11/285,623, filed on Nov. 22, 2005, now Pat. No. 7,125,357, which is a continuation of application No. 10/667,168, filed on Sep. 19, 2003, now Pat. No. 7,004,869, which is a continuation of application No. 10/007,402, filed on Dec. 5, 2001, now Pat. No. 6,648,785.

(60) Provisional application No. 60/286,120, filed on Apr. 24, 2001.

(51) Int. Cl.
B60K 17/34  (2006.01)
F16H 3/72   (2006.01)

(52) U.S. Cl. .................. 180/243; 180/65.21; 180/53.6; 475/5

(58) Field of Classification Search .................. 180/243, 180/65.21, 53.5, 53.6; 475/5
See application file for complete search history.

(56) References Cited

U.S. PATENT DOCUMENTS

| 5,017,183 A | 5/1991 | Teraoka et al. |
| 5,620,387 A | 4/1997 | Janiszewski et al. |
| 5,839,535 A | 11/1998 | Arai et al. |
| 5,954,612 A | 9/1999 | Baxter, Jr. |
| 6,041,877 A | 3/2000 | Yamada et al. |
| 6,048,289 A | 4/2000 | Hattori et al. |
| 6,059,064 A | 5/2000 | Nagano et al. |
| 6,083,138 A | 7/2000 | Aoyama et al. |
| 6,083,139 A | 7/2000 | Deguchi et al. |
| 6,098,733 A | 8/2000 | Ibaraki et al. |
| 6,099,430 A | 8/2000 | Winks |
| 6,110,066 A | 8/2000 | Nedungadi et al. |
| 6,116,363 A | 9/2000 | Frank |
| 6,146,302 A | 11/2000 | Kashiwase et al. |

(Continued)

FOREIGN PATENT DOCUMENTS

GB    2088975    6/1982

(Continued)

*Primary Examiner*—Tony H. Winner
(74) *Attorney, Agent, or Firm*—Harness, Dickey & Pierce, P.L.C.

(57) ABSTRACT

A hybrid drive system for a four-wheel drive system arranged to supply motive power to a first output shaft of a transfer case from an internal combustion engine and to a second output shaft from an electric motor/generator. The transfer case includes a reduction gearset driven by the electric motor/generator, a power take-off unit driven by the reduction gearset, and a disconnect clutch operable for selectively coupling the reduction gearset to the second output shaft. This hybrid drive arrangement permits installation of a modified transfer case in place of a conventional transfer case for use in a traditional four-wheel drive driveline arrangement.

23 Claims, 7 Drawing Sheets

U.S. PATENT DOCUMENTS

| | | |
|---|---|---|
| 6,371,878 B1 | 4/2002 | Bowen |
| 6,464,608 B2 | 10/2002 | Bowen et al. |
| 6,490,945 B2 | 12/2002 | Bowen |
| 6,499,549 B2 | 12/2002 | Mizon et al. |
| 6,589,128 B2 | 7/2003 | Bowen |
| 6,648,785 B2 | 11/2003 | Porter |
| 7,004,869 B2 | 2/2006 | Porter |
| 7,125,357 B2 | 10/2006 | Porter |
| 7,452,301 B2 | 11/2008 | Yoshioka |
| 7,533,754 B2 | 5/2009 | Burrows et al. |

FOREIGN PATENT DOCUMENTS

| | | |
|---|---|---|
| JP | 401095944 | 4/1989 |
| JP | 4302744 | 10/1992 |
| JP | 405131858 | 5/1993 |

ELECTRICALLY-DRIVEN TRANSFER CASE WITH POWER TAKE-OFF

CROSS-REFERENCE TO RELATED APPLICATIONS

This application is a continuation-in-part of U.S. patent application Ser. No. 11/517,400 filed Sep. 7, 2006, which is a continuation of U.S. patent application Ser. No. 11/285,623 filed Nov. 22, 2005, now U.S. Pat. No. 7,125,357, which is a continuation of U.S. patent application Ser. No. 10/667,168 filed Sep. 19, 2003, now U.S. Pat. No. 7,004,869, which is a continuation of U.S. patent application Ser. No. 10/007,402 filed Dec. 5, 2001, now U.S. Pat. No. 6,648,785, which claims the benefit of U.S. Provisional Application No. 60/286,120, filed Apr. 24, 2001.

FIELD OF THE INVENTION

The present invention relates generally to hybrid drive systems for motor vehicles and, more specifically, to a transfer case for use in four-wheel drive hybrid vehicles.

BACKGROUND OF THE INVENTION

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid vehicles have also been adapted to four-wheel drive vehicles and typically utilize the above-noted parallel hybrid powertrain to drive the primary wheels and a second electric motor to drive the secondary wheels. Obviously, such a four-wheel drive system is extremely expensive and difficult to package. Thus, a need exists to develop hybrid powertrains for use in four-wheel drive vehicles that utilize many conventional powertrain components so as to minimize specialized packaging and reduce cost.

SUMMARY OF THE INVENTION

It is therefore an object of the present invention to provide a hybrid powertrain or drive system for a four-wheel drive vehicle.

In accordance with another object, the four-wheel drive hybrid drive system of the present invention includes a transfer case adapted for connection between the transmission and the front and rear drivelines of the motor vehicle.

According to another object, the four-wheel drive hybrid drive system is a parallel-type system with an internal combustion engine as a first power source and an electric motor/generator as a second power source which is integrated into the transfer case.

As a related object, the hybrid drive system of the present invention permits use of the internal combustion engine and the electric motor/generator separately or in combination as power sources for driving the motor vehicle.

According to yet another object, the electric motor/generator drives a power take-off for driving accessories so as to improve fuel economy over conventional engine-driven accessory drive systems.

These and other objects are provided by a transfer case adapted for use in a hybrid vehicle drive system having a primary power source, a primary driveline and a secondary driveline. The transfer case includes a primary output shaft connecting the primary power source to the primary driveline, a secondary output shaft connected to the secondary driveline, a reduction unit having an input member and an output member connected to the secondary output shaft, and a secondary power source connected to the input member of the reduction unit. The primary power source is a powertrain comprised of an internal combustion engine and a transmission. The secondary power source is an electric motor/generator.

These and other objects are also provided by a transfer case adapted for use in a hybrid drive system for a vehicle having a first power source, a first driveline and a second driveline. The transfer case includes a first output shaft connecting the first power source to the first driveline, a second output shaft coupled to the second driveline, a reduction gearset driven by a second power source, a power take-off unit driven by the reduction gearset, and a clutch for selectively coupling the reduction gearset to the second output shaft. The first power source is a powertrain having an internal combustion engine and a transmission. The second power source is an electric motor/generator. The reduction gearset has an input driven by the motor/generator and an output which drives the power take-off. The clutch is operable to selectively couple the output of the reduction gearset to the second output shaft.

Further areas of applicability of the present invention will become apparent from the detailed description provided hereinafter. It should be understood that the detailed description and specific examples, while indicating preferred embodiments of the present invention, are intended for purposes of illustration only since various changes and modifications within the scope of this particular invention will become apparent to those skilled in the art.

DETAILED DESCRIPTION OF THE PREFERRED EMBODIMENT

Figure 1:
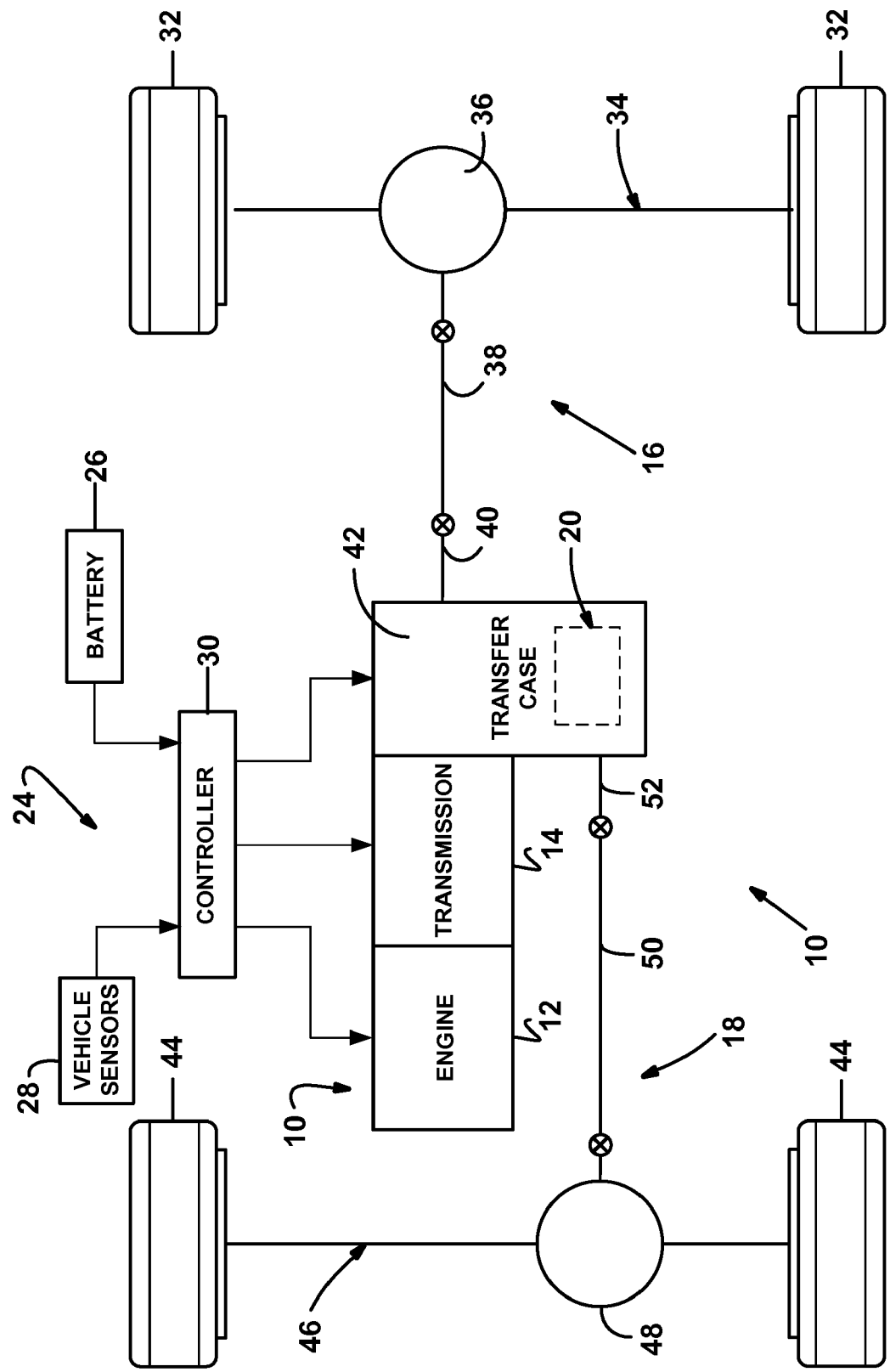
FIG. 1 shows a hybrid drive system for a four-wheel drive vehicle in accordance with the present invention.

Referring to the drawings, a four-wheel drive powertrain for a hybrid motor vehicle is shown to include a primary power source 10 comprised of an internal combustion engine 12 and a transmission 14, a primary driveline 16, a secondary driveline 18, and a secondary power source 20 shown to include an electric motor/generator 22. The vehicle further includes a powertrain control system 24 generally shown to include a battery 26, a group of vehicle sensors 28 and a controller 30. Primary driveline 16 includes a first pair of wheels 32 connected to a first axle assembly 34 having a first differential unit 36 connected to one end of a first prop shaft 38, the opposite end of which is connected to a first output shaft 40 of a transfer case 42. Similarly, secondary driveline 18 includes a second pair of wheels 44 connected to a second axle assembly 46 having a second differential unit 48 connected to one end of a second prop shaft 50, the opposite end of which is connected to a second output shaft 52 of transfer case 42.

In the embodiment shown, primary driveline 16 is the rear driveline such that motive power (i.e., drive torque) generated by engine 12 and transmission 14 is transmitted to rear wheels 32 for establishing a two-wheel/rear drive mode of operation. As will be detailed, electric motor/generator 22 is operable to drive secondary driveline 18 that is, the front driveline, such that motive power is transmitted to front wheels 44 for establishing either of a two-wheel/front drive mode or a four-wheel drive mode. It is to be understood that the present invention is likewise applicable to a drivetrain arrangement in which primary power source 10 transmits power to the front driveline while secondary power source 20 transmits power to the rear driveline.

Figure 2:
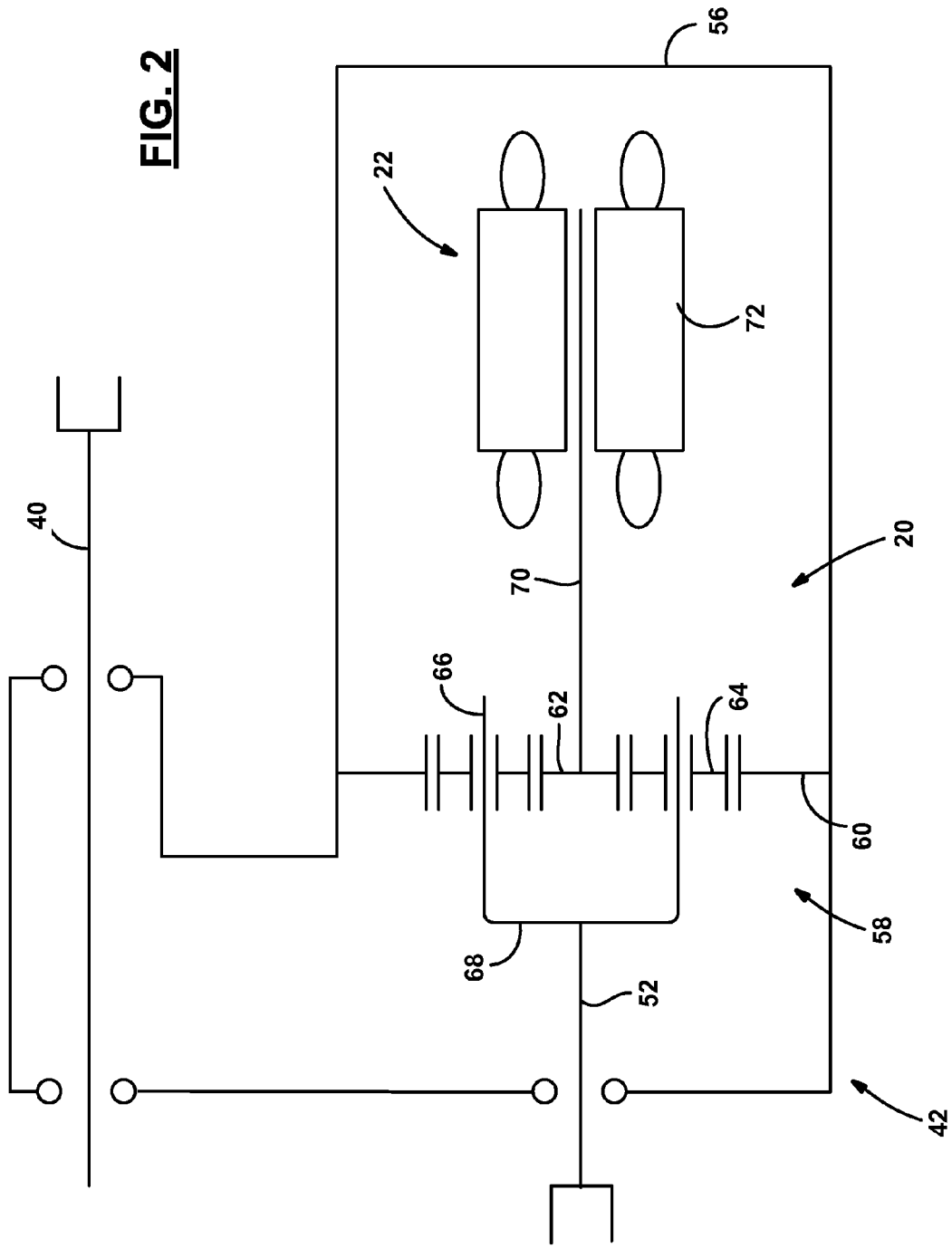
FIG. 2 is a schematic view of a transfer case associated with the hybrid powertrain of FIG. 1.

Referring now primarily to FIG. 2, transfer case 42 is shown schematically to include a housing assembly 56 of the type normally adapted for bolted mounting to the casing of transmission 14. First output shaft 40 is rotatably supported in housing 56 by suitable bearing assemblies and is adapted for direct connection between the output shaft of transmission 14 and first prop shaft 38. In this manner, drive torque from engine 12 is transferred through transmission 14 and first output shaft 40 to primary driveline 16. Transfer case 42 further includes a planetary gearset 58 operably installed between second output shaft 52 and electric motor/generator 22. Gearset 58 includes ring gear 60 non-rotationally fixed (i.e., such as to housing 56 of transfer case 42), a sun gear 62, and planet gears 64 meshed with sun gear 63 and ring gear 60. Planet gears 64 are rotatably supported on pins 66 that are fixed to a planet carrier 68. As seen, planet carrier 68 is fixed for rotation with second output shaft 52 while sun gear 62 is fixed for rotation with a rotor shaft 70 of motor/generator 22.

Thus, energization of a stator 72 of motor/generator 22 causes driven rotation of rotor shaft 70 and sun gear 62 which results in rotation of planet carrier 68 at a reduced speed, such that planetary gearset 58 acts as a reduction gearset. While not intended to be limiting, it is contemplated that a preferred reduction ratio of about 3 to 1 is established by planetary gearset 58.

Figure 3:
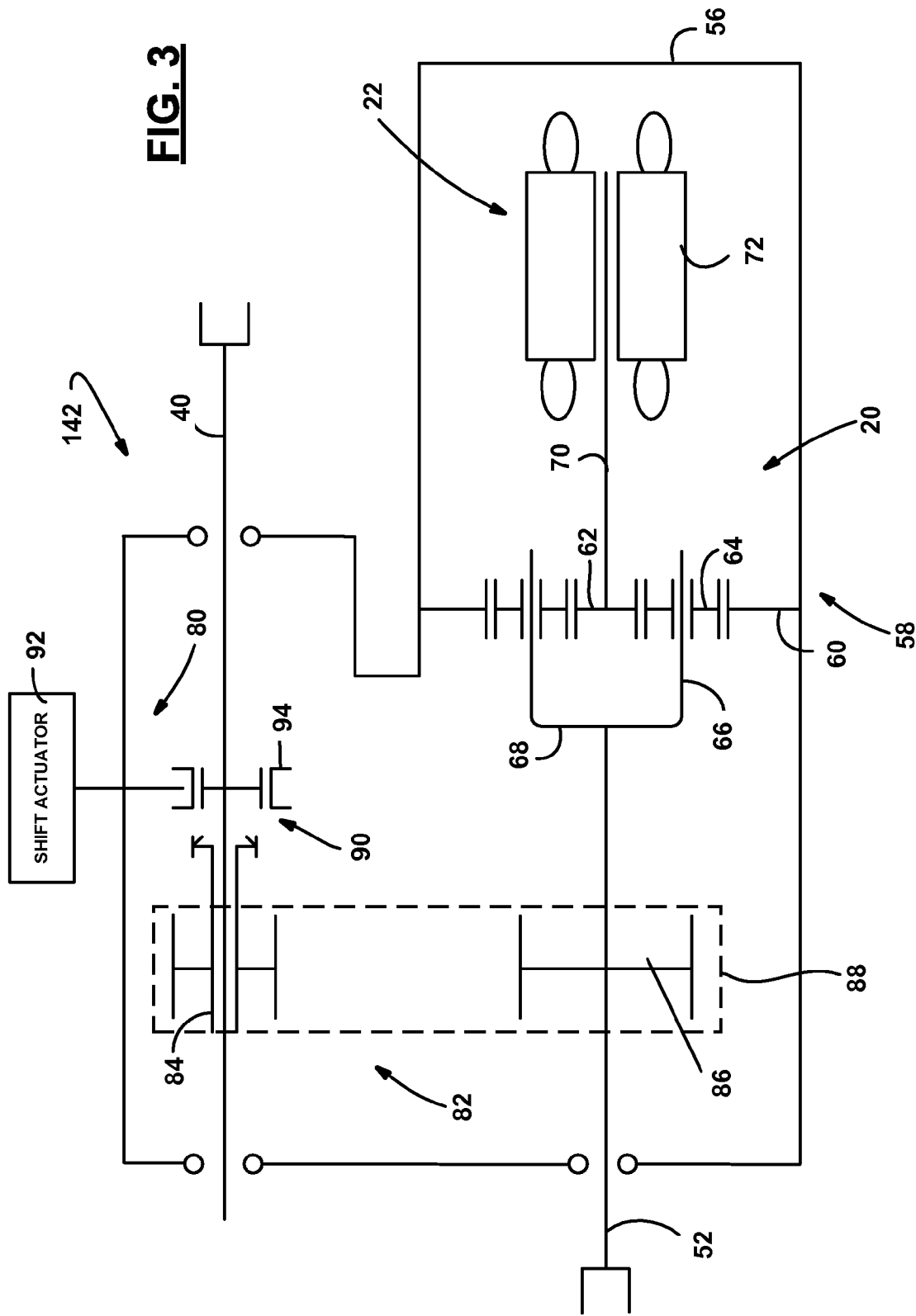
FIG. 3 is a schematic of an alternative construction for a transfer case adapted for use in the hybrid drive system of FIG. 1.

Transfer case 42 is, in essence, not a transfer unit but rather a unit for housing secondary power source 20 within the packaging conventionally provided for the transfer case in a four-wheel drive vehicle. Another hybrid transfer case 142 is shown in FIG. 3 which is generally similar to transfer case 42 except that a selectively engageable clutch and shift system 80 is incorporated therein. System 80 includes a transfer assembly 82 for selectively transferring drive torque from first output shaft 40 to second output shaft 52 to establish a locked four-wheel drive mode. Transfer assembly 82 includes a first sprocket 84 rotatably supported on first output shaft 40, a second sprocket 86 fixed to second output shaft 52, and a power chain 88 meshed therebetween. A mode clutch 90 is provided for selectively coupling first sprocket 84 to first output shaft 40. Mode clutch 90 is shown as a synchronized dog clutch having a power-operated shift actuator 92 that is operable for moving a dog sleeve 94 between a released and an engaged position. It will be understood that dog clutch can be readily replaced with a power-operated (electromagnetic, hydraulic, pneumatic, motor-driven, etc.) multi-plate friction clutch disposed between first output shaft 40 and first sprocket 84 such that the torque transfer can be adaptively controlled anywhere in a range between 100:0 to 50:50 rear-to-front ratio.

The hybrid drive system of the present invention includes two drive power sources, namely internal combustion engine 12 and electric motor/generator 22. Power from engine 12 is transmitted to transmission 14 which, in turn, is delivered to transfer case 42 or 142 via the transmission output shaft. Transmission 14 can be of any known type (i.e., automatic, manual, automated manual, CVT) having a forward-reverse switching mechanism and a gearshift mechanism. Motor/generator 22 is connected to battery 26 and can be selectively placed in any of a DRIVE state, a CHARGING state, and a NO-LOAD state by controller 30. In the DRIVE state, motor/generator 22 functions as an electric motor which is driven by electric energy supplied from battery 26. In the CHARGING state, motor/generator 22 functions as an electric generator with regenerative braking (brake torque electrically generated by motor/generator 22) for storing electrical energy in battery 26. In the NO-LOAD state, the output (i.e., rotor 70) of motor/generator 22 is permitted to rotate freely.

Figure 4:
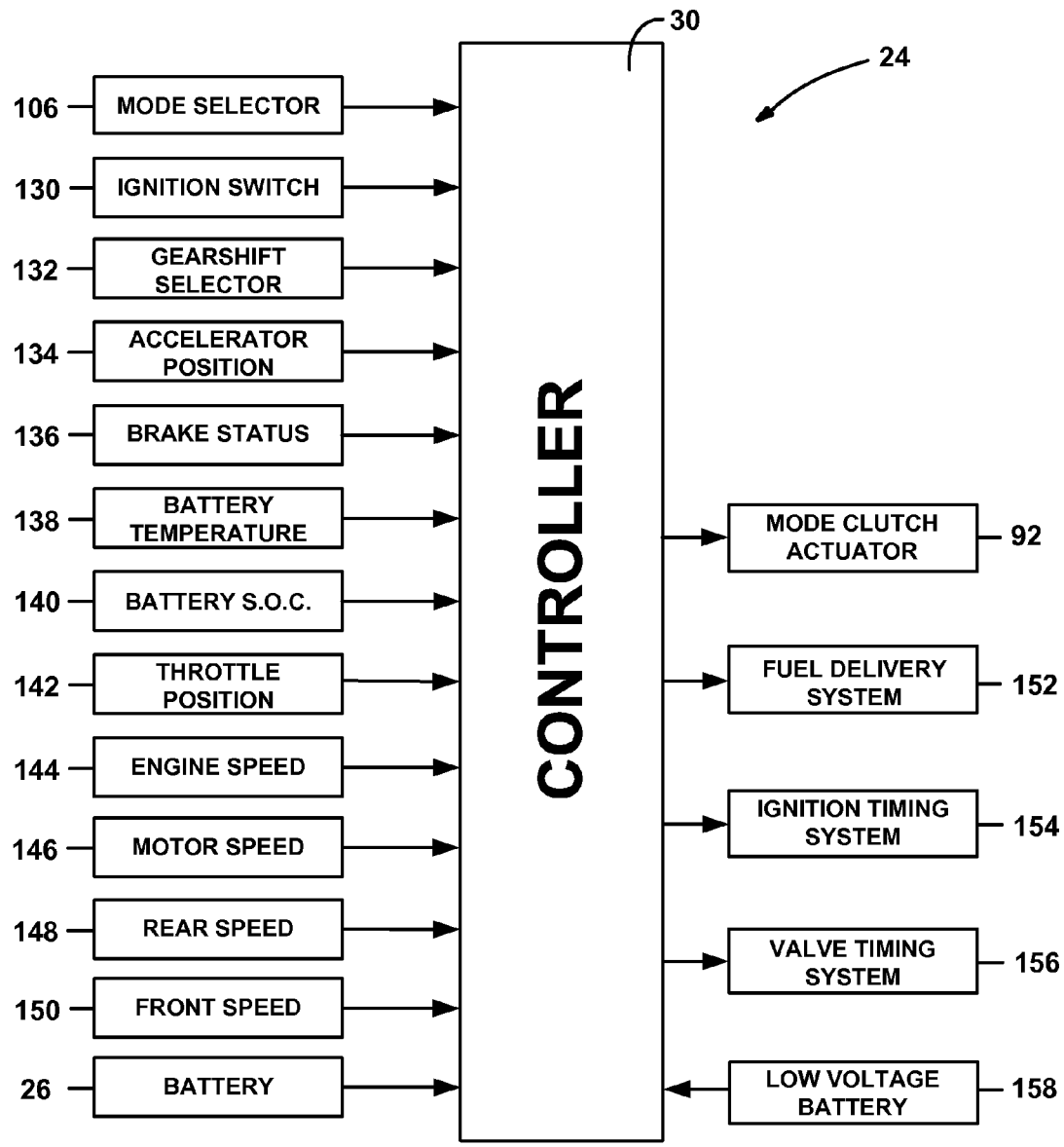
FIG. 4 is a diagram showing a control system associated with the hybrid drive systems of the present invention.

As noted, control system 24 is provided for controlling operation of the hybrid powertrain shown in FIG. 1 equipped with either of transfer cases 42 or 142. Referring to FIG. 4, controller 30 is shown to receive input signals from various sensors and input devices previously identified cumulatively in FIG. 1 as vehicle sensors 28. Controller 30 is principally comprised of a microcomputer having a central processing unit (CPU), random-access memory (RAM), read-only memory (ROM) and an input-output actuator interface. Controller 30 performs data processing operations to execute various control routines according to control programs and/or maps stored in the ROM. Controller 30 may receive data from an ignition switch 130, a gearshift lever switch 132, an accelerator position sensor 134, a brake status switch 136, a battery temperature sensor 138, a battery SOC (state of charge) sensor 140, and a throttle position sensor 142. In addition, other inputs may include an engine speed sensor 144, a motor speed sensor 146, a rear shaft speed sensor 148 and a front shaft speed sensor 150. Ignition switch 130 is closed when the vehicle key is turned on. Assuming transmission 14 is of an automatic type, then "P", "N", "R", and "D" switches in gearshift selector switch 132 are closed when the gearshift mechanism is located in its Park (P), Neutral (N), Reverse (R) and Drive (D) positions, respectively. Accelerator position sensor 134 senses the depression angle of an accelerator pedal. Brake status switch 136 is turned on when the brake pedal is depressed. Battery temperature sensor 138 senses the temperature of battery 26. Battery SOC sensor 140 senses the charge level of battery 26. Throttle position sensor 142 senses the degree of opening of the engine throttle valve. Engine speed sensor 144 senses a parameter indicative of the rotary speed of the drive shaft of engine 12. Motor speed sensor 146 senses a parameter indicative of the rotary speed of rotor 70 of motor/generator 22. Rear speed sensor 148 senses the rotary speed of either first output shaft 40 or first propshaft 38 and can further be used as an indication of vehicle speed. Front speed sensor 150 senses the rotary speed of either second output shaft 52 or second prop shaft 50.

Based upon the operating information inputted to controller 30, a mode of operation of the hybrid powertrain is selected and controller 30 sends electric control signals to the various power-operated controlled devices. Specifically, controller 30 monitors and continuously controls actuation of electric motor/generator 22. Additionally, controller 30 monitors and controls various engine management systems for controlling the speed and torque generated by engine 12. These may include a fuel injection system 152, an ignition timing system 154, and a valve timing system 156. A low voltage auxiliary battery 158 may serve as the power supply for controller 30.

There are four modes of operation for the motor vehicle shown in FIG. 1, namely: (a) an electric mode; (b) a hybrid mode; (c) an engine mode; and (d) a regenerative mode. In the electric mode, only motor 22 provides motive power to the vehicle. In the hybrid mode, both engine 12 and motor 22 provide motive power to the vehicle. In the engine mode, only engine 12 provides motive power to the vehicle. In the regenerative mode, a portion of the engine power is absorbed by motor/generator 22 to charge battery 26. The transition from one mode to the next is smooth and transparent to the vehicle operator since controller 30 selects the most appropriate mode depending on various vehicle operating conditions including vehicle speed, accelerator demand and battery charge status.

During operation in the electric mode, it is contemplated that the vehicle may be driven up to about thirty miles per hour. This permits use of the electric mode in urban areas and stop and go driving so as to reduce the overall fuel consumption of vehicle 10.

When shifting from the electric mode into the hybrid mode, engine 12 is started. As such, engine 12 and transmission 14 deliver power to primary driveline 16 while motor/generator 22 delivers power to secondary driveline 18. Controller 30 controls engine torque via real-time control of the various engine management systems in conjunction with controlling the motor torque developed by motor/generator 22. Under light throttle conditions, motor/generator 22 may be placed in its CHARGING state to recharge battery 26.

When operating conditions of vehicle 10 warrant operation in the engine only mode, the hybrid drive system is switched by simply shifting motor/generator 22 into its NO-LOAD state. Additionally, motor/generator 22 may be shifted into its CHARGING state to provide regenerative braking. A mode selector 106 is provided for permitting the vehicle operator to intentionally select operation in one of an AUTO mode and a 4WD mode. Based on the particular drive mode selected, controller 30 controls the actuated condition of mode clutch 90. As such, various two-wheel drive and four-wheel drive modes are available at all times. Thus, vehicle 10 combines the commercially-successful features of a traditional four-wheel drive drivetrain architecture (engine, transmission and transfer case) with hybrid power control to significantly advance the hybrid drive technology. Moreover, the present invention provided an arrangement for a hybrid four-wheel drive vehicle which is not highly customized, but rather permits "drop-in" assembly of a hybrid transfer case in place of a conventional transfer case. This arrangement also permits the use of a smaller internal combustion engine that is sized for cruise operation while the electric assist of the motor/generator is capable of driving the vehicle at low speeds.

Figure 5:
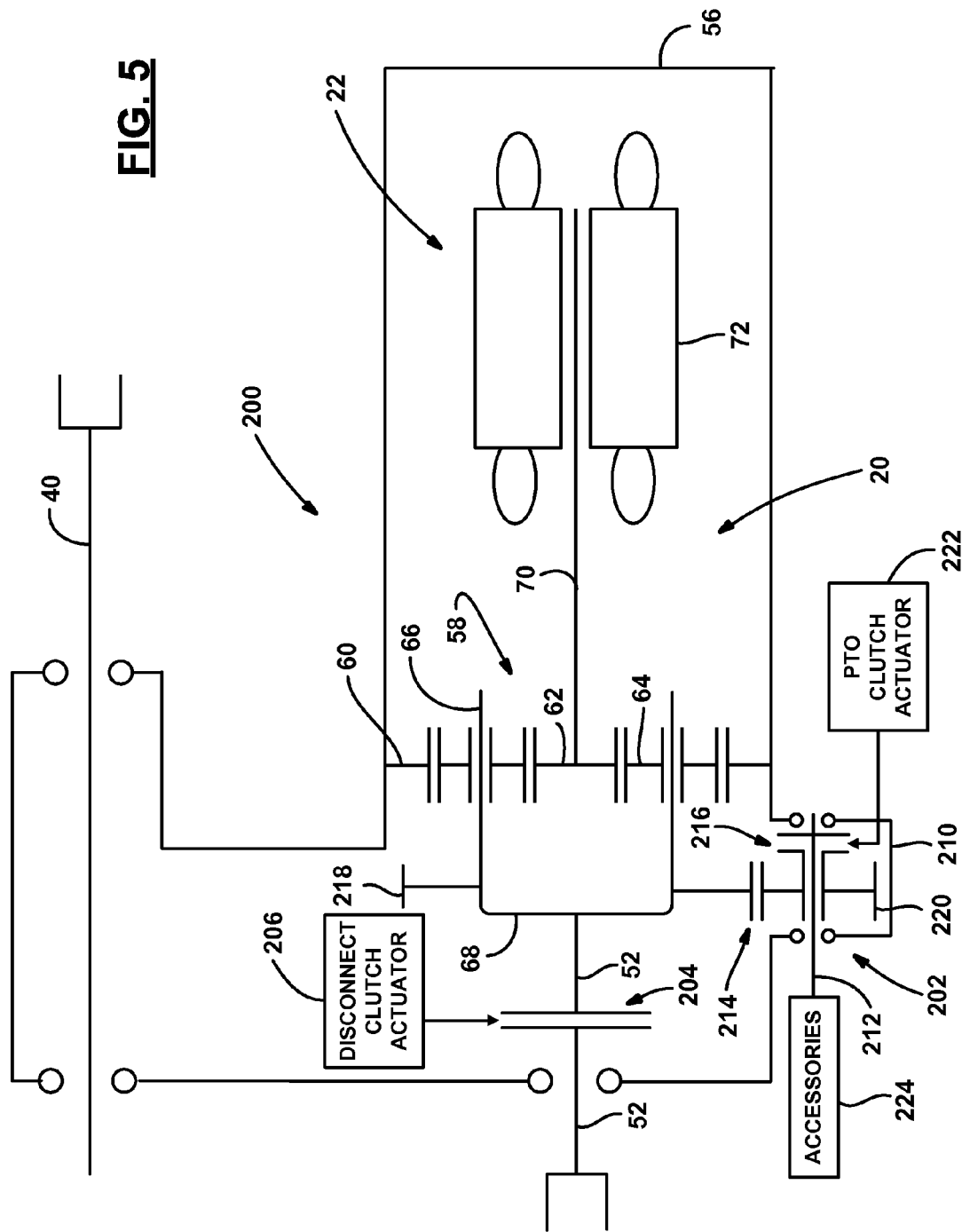
FIG. 5 is a schematic view of a modified version of the transfer case shown in FIG. 2 and which is adapted for use with the hybrid drive system of FIG. 1.
Figure 7:
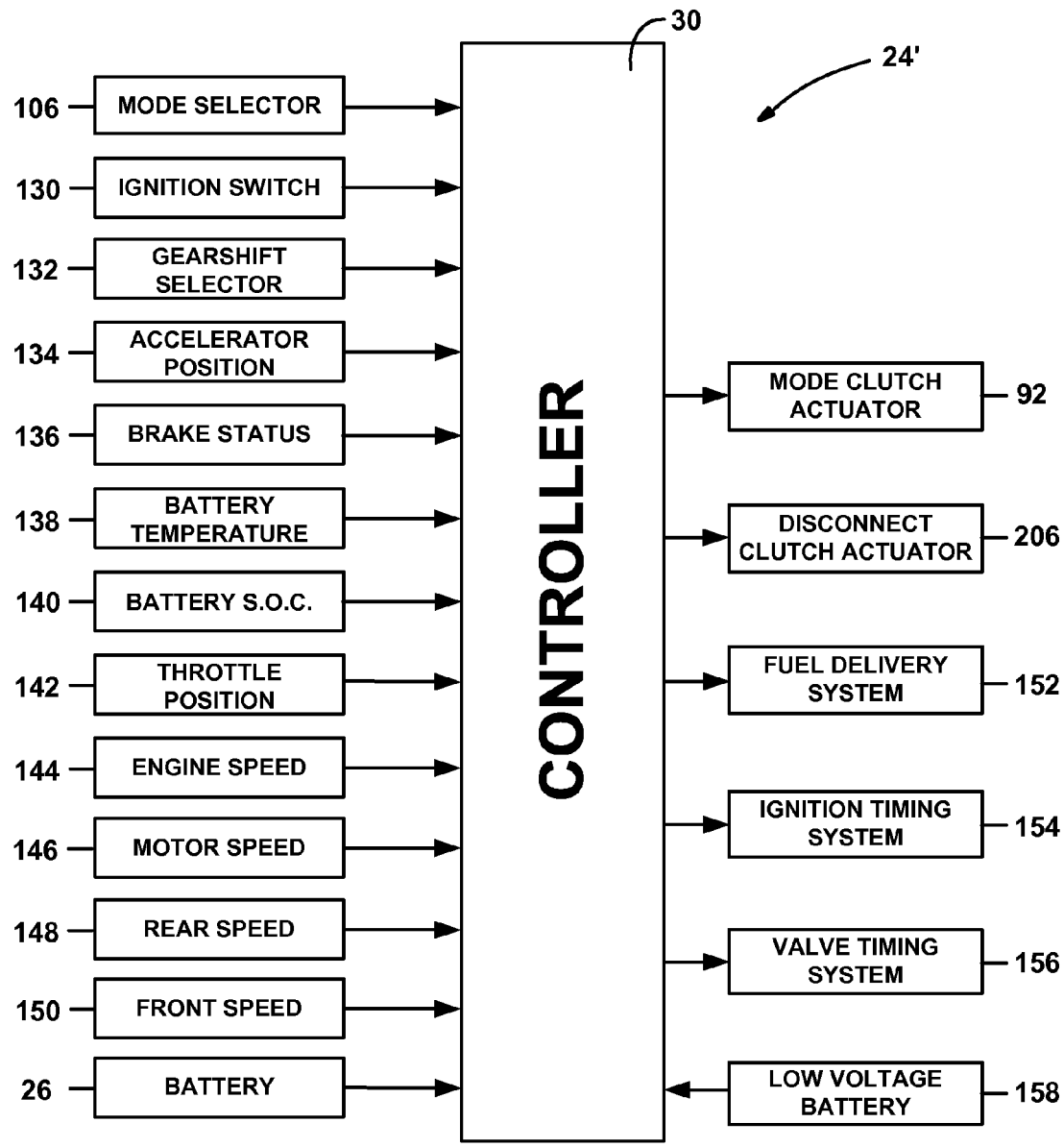
FIG. 7 is a diagram of a control system associated with the hybrid drive system equipped with either of the transfer cases shown in FIGS. 5 and 6.

FIGS. 5 and 7 illustrate a transfer case 200 and its associated hybrid control system 24'. In general, transfer case 200 is a modified version of transfer case 42 which is now equipped with a power take-off assembly 202 and a disconnect clutch 204. As seen, disconnect clutch 204 is operably disposed between planet carrier 68 of reduction gearset 58 and second output shaft 52. A power-operated disconnect clutch actuator 206 is provided for selectively shifting disconnect clutch 204 between a released and an engaged state. Disconnect clutch 204 is schematically shown so as to encompass any type of suitable dog-type clutch, cone clutch or multi-plate friction clutch that is operable for facilitating engagement between the output of reduction gearset 58 and second output shaft 52. As before, power-operated clutch actuator 206 can include any suitable actuation device (electromagnetic, hydraulic, pneumatic, or motor-driven) that controls engagement of disconnect clutch 204 in response to a control signal from controller 30.

As noted, transfer case 200 includes a power take-off assembly 202 which is provided to drive accessory systems installed on the vehicle that would otherwise have been driven by engine 12. Power take-off assembly 202 is shown to include a housing 210 adapted to be rigidly secured to transfer case housing 56, a power take-off shaft 212 rotatably supported in housing 210, a take-off gearset 214, and a PTO clutch 216. Gearset 214 includes a drive gear 218 coupled for common rotation with planet carrier 68 of reduction gearset 58 and a driven gear 220 that is meshed with drive gear 218. Driven gear 220 is shown to be rotatably supported on take-off shaft 212. PTO clutch 216 is operably disposed between driven gear 220 and take-off shaft 212. PTO clutch 212 is schematically shown so as to encompass any suitable dog-type clutch, cone clutch or friction clutch operable for facilitating engagement of driven gear 220 to take-off shaft 212. A power-operated PTO clutch actuator 222 is operable for selectively coupling driven gear 220 to take-off shaft 212 and can include any suitable power-operated device which controls engagement of PTO clutch 216 in response to a control signal from controller 30. When clutch 216 is engaged, gearset 214 transfers rotary power from electric motor/generator 22 to take-off shaft 212 which, in turn, drives accessories, denoted schematically by block 224.

When the vehicle of FIG. 1 is equipped with hybrid transfer case 200 it is also capable of operation in the four modes previously described. Specifically, the electric mode is established when disconnect clutch 204 is engaged and motor/generator 22 is functioning as an electric motor to transmit motive power to second output shaft 52 while no motive power is transmitted by engine 12 to first output shaft 40. In the hybrid mode, disconnect clutch 204 is maintained in its engaged state and both engine 12 and electric motor 22 provide motive power to their corresponding drivelines. In the engine mode, only engine 12 provides motive power to the vehicle and disconnect clutch 204 would typically be shifted into its released state. However, PTO clutch 216 can be engaged to drive accessories 224 while disconnect clutch 204 is released. Finally, in the regenerative mode, disconnect clutch 204 is engaged to allowed motor shaft 70 to be driven through gearset 55 to permit motor/generator 22 to function as a generator.

Figure 6:
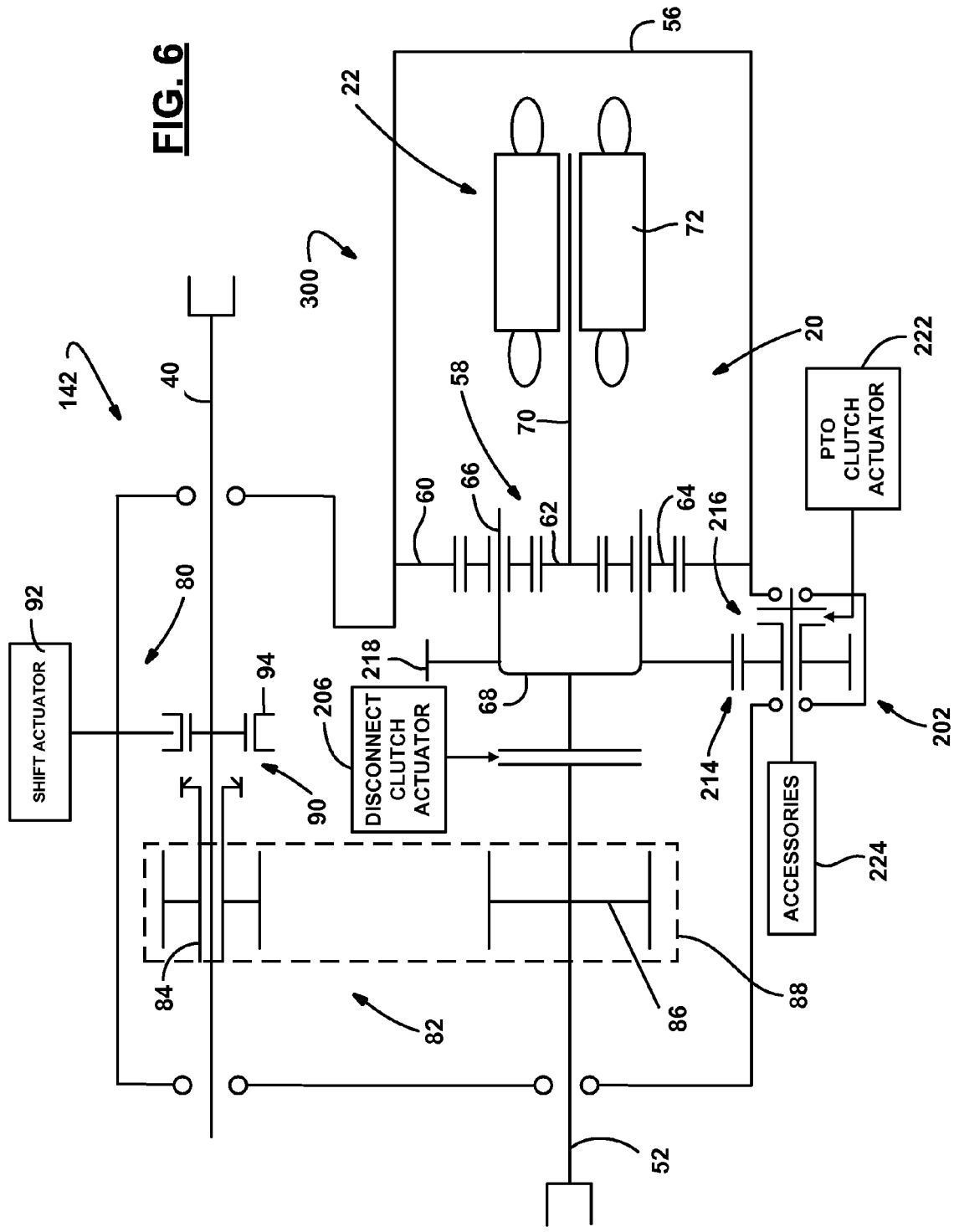
FIG. 6 is a schematic view of a modified version of the transfer case shown in FIG. 3 and which is adapted for use with the hybrid drive system of FIG. 1.

Referring to FIG. 6, another transfer case 300 is shown which is also well suited for use with the hybrid drive system of FIG. 1 utilizing control system 24' of FIG. 7. In general, transfer case 300 is a modified version of transfer case 142 which is now equipped with power take-off assembly 202 and disconnect clutch 204. The components and function associated with power-takeoff assembly 202 and disconnect clutch 204 are substantially similar to that previously described for transfer case 200 and, as such, further explanation is not required. However, since transfer case 300 also includes mode clutch 90, it is possible for the vehicle operator to select operation in one of the AUTO mode and the 4WD mode via manipulation of mode selector 106. In the AUTO mode, mode clutch 90 is released such that controller 30 can select operation in any one of the engine mode, the hybrid mode or the electric mode to provide drive torque to the wheels and maximize fuel efficiency. In contrast, when mode clutch 90 is engaged, the 4WD mode is selected with tractive power supplied by one of engine 12 and electric motor 22 to all four wheels. If power is supplied by engine 12, disconnect clutch 204 can be released to permit power take-off assembly 202 to drive accessory systems 224.

Preferred embodiments of the invention have been disclosed to provide those skilled in the art an understanding of the best mode currently contemplated for the operation and construction of the four-wheel drive hybrid drive system. The invention being thus described, it will be obvious that various modifications can be made without departing from the true spirit and scope of the invention, and all such modifications as would be considered by those skilled in the art are intended to be included within the scope of the following claims.

What is claimed is:

1. A hybrid motor vehicle, comprising:
   a primary power source;
   a first driveline including a set of first wheels;
   a second driveline including a set of second wheels;
   a transfer case having a first output shaft connecting said primary power source to said first driveline, a second output shaft connected to said second driveline, a secondary power source including an electric motor having a rotary motor shaft, and a disconnect clutch operable for selectively coupling said second output shaft for rotation with said motor shaft;
   an accessory drive system;
   a power take-off unit having an input component driven by said motor shaft and an output component driving said accessory drive system; and
   a control system for controlling actuation of said electric motor and said disconnect clutch.

2. The hybrid motor vehicle of claim 1 wherein said control system defines an electric drive mode when said disconnect clutch is engaged to couple said second output shaft for rotation with said motor shaft and said electric motor is actuated to transmit drive torque to said second output shaft while said first output shaft is not driven by said primary power source.

3. The hybrid motor vehicle of claim 1 wherein said control system defines a hybrid drive mode when said disconnect clutch is engaged and said electric motor transmits drive torque to said second output shaft while said primary power source transmits drive torque to said first output shaft.

4. The hybrid motor vehicle of claim 1 wherein said transfer case further includes a reduction unit having an input member driven by said motor shaft and an output member driven at a reduced speed relative to said input member, and wherein said output member of said reduction unit drives said input component of said power take-off unit.

5. The hybrid motor vehicle of claim 4 wherein said disconnect clutch is arranged to selectively couple said output member of said reduction unit to said second output shaft.

6. The hybrid motor vehicle of claim 1 wherein said power take-off unit includes a PTO clutch that is operable for selectively coupling said output component to said accessory drive system.

7. A hybrid motor vehicle, comprising:
   a powertrain having a rotary powertrain output;
   a first driveline including a first differential connecting a pair of first wheels;
   a second driveline including a second differential connecting a pair of second wheels;
   a transfer case including a first output shaft connecting said rotary powertrain output to said first differential, a second output shaft connected to said second differential and an electric motor having a rotary motor output driving said second output shaft;
   an accessory drive assembly;
   a power take-off unit connecting said rotary motor output to said accessory drive assembly; and
   a control system for controlling actuation of said electric motor for transferring power to said second output shaft, and wherein an electric operating mode is established when said electric motor is actuated for driving said second output shaft while no power is transferred by said electric motor to said first output shaft.

8. The hybrid motor vehicle of claim 7 wherein a hybrid operating mode is established when said powertrain is actuated for driving said first output shaft and said electric motor is actuated for driving said second output shaft.

9. The hybrid motor vehicle of claim 7 wherein said transfer case further includes a mode clutch for selectively coupling said second output shaft for rotation with said first output shaft.

10. The hybrid motor vehicle of claim 7 wherein said transfer case further includes a gearset having an input driven by said motor output and an output driving said second output shaft.

11. The hybrid motor vehicle of claim 10 wherein said transfer case further includes a disconnect clutch for selectively releasing and coupling said output of said gearset for rotation with said second output shaft.

12. The hybrid motor vehicle of claim 7 wherein said transfer case further includes a disconnect clutch operably disposed between said rotary motor output and said second output shaft.

13. The hybrid motor vehicle of claim 7 wherein said power take-off unit includes a clutch operably disposed between said motor output and a driven component of said accessory drive assembly.

14. A hybrid motor vehicle, comprising:
   an engine;
   first and second drivelines;
   an accessory drive assembly;
   a transfer case having a first output shaft for transmitting drive torque from said engine to said first driveline, a second output shaft connected to said second driveline, and an electric motor that can be selectively actuated for transmitting drive torque to said second output shaft;

a power take-off unit interconnecting said motor to said accessory drive assembly; and a control system operable to establish an engine drive mode and an electric drive mode, wherein said engine drive mode is established when said engine drives said first output shaft and said electric motor is off, and wherein said electric drive mode is established when said engine is off and said electric motor drives said second output shaft.

15. The hybrid motor vehicle of claim 14 wherein said control system is operable to establish a hybrid drive mode when said engine drives said first output shaft and said electric motor drives said second output shaft.

16. The hybrid motor vehicle of claim 14 wherein said transfer case further includes a disconnect clutch disposed between said electric motor and said second output shaft, said disconnect clutch is operable in a released mode to permit said electric motor to drive said accessory drive assembly without transmitting drive torque to said second output shaft and in an engaged mode to transmit drive torque to said second output shaft.

17. The hybrid motor vehicle of claim 16 wherein said transfer case further includes a reduction gearset having a first component driven by said motor and a second component driving said power take-off unit, and wherein said disconnect clutch is operable for selectively coupling said second component of said reduction gearset to said second output shaft.

18. The hybrid motor vehicle of claim 16 wherein said power take-off unit includes a PTO clutch for selectively coupling said second component of said reduction gearset to a drive component of said accessory drive assembly.

19. A transfer case for use in a motor vehicle having an engine, first and second drivelines and an accessory drive assembly, the transfer case comprising:

a first output shaft operable to transmit drive torque from the engine to the first driveline;

a second output shaft driving the second driveline;

an electric motor having a rotary motor output operable to transmit drive torque to said second output shaft; and a power take-off unit having an input component driven by said motor output and an output component driving the accessory drive assembly.

20. The transfer case of claim 19 further comprising:

a first clutch for releaseably coupling said motor output to said second output shaft; and a second clutch for releaseably coupling said output component to said input component of said power take-off unit.

21. The transfer case of claim 19 further comprising:

a first clutch for releaseably coupling said motor output to said second output shaft; and a second clutch for releaseably coupling said second output shaft to said first output shaft.

22. The transfer case of claim 19 further including a reduction gearset disposed between said motor output and said second output shaft.

23. The transfer case of claim 22 wherein said input component of said power take-off unit is driven by said reduction gearset.

* * * * *